United States Patent
Hogue

(10) Patent No.: US 11,796,283 B2
(45) Date of Patent: Oct. 24, 2023

(54) OVERLAY FOR GRIPPING FIREARM

(71) Applicant: Patrick Leonard Hogue, Atascadero, CA (US)

(72) Inventor: Patrick Leonard Hogue, Atascadero, CA (US)

(*) Notice: Subject to any disclaimer, the term of this patent is extended or adjusted under 35 U.S.C. 154(b) by 0 days.

(21) Appl. No.: 17/214,031

(22) Filed: Mar. 26, 2021

(65) Prior Publication Data
US 2021/0325143 A1    Oct. 21, 2021

Related U.S. Application Data

(60) Provisional application No. 63/012,650, filed on Apr. 20, 2020.

(51) Int. Cl.
| | |
|---|---|
| *F41C 23/18* | (2006.01) |
| *F41C 23/16* | (2006.01) |
| *B32B 27/30* | (2006.01) |
| *B32B 27/08* | (2006.01) |
| *B32B 27/32* | (2006.01) |
| *B32B 7/12* | (2006.01) |

(52) U.S. Cl.
CPC ............ *F41C 23/18* (2013.01); *B32B 7/12* (2013.01); *B32B 27/08* (2013.01); *B32B 27/306* (2013.01); *B32B 27/32* (2013.01); *F41C 23/16* (2013.01)

(58) Field of Classification Search
CPC ........ F41C 23/18; F41C 23/16; B32B 27/306; B32B 27/08; B32B 27/32; B32B 7/12
See application file for complete search history.

(56) References Cited

U.S. PATENT DOCUMENTS

| | | | | |
|---|---|---|---|---|
| 2004/0151933 A1* | 8/2004 | Ajbani | .................. | C08L 51/006 428/515 |
| 2009/0134551 A1* | 5/2009 | Delehanty | ............... | C08L 83/04 264/299 |
| 2010/0183814 A1* | 7/2010 | Rios | ........................ | C08J 7/046 427/387 |

\* cited by examiner

*Primary Examiner* — Michael C Miggins
(74) *Attorney, Agent, or Firm* — Bennet K. Langlotz; Langlotz Patent & Trademark Works, LLC

(57) ABSTRACT

A grip for a firearm comprised of an outer layer formed of thermoplastic vulcanite, an intermediate layer having a higher surface energy than the thermoplastic vulcanite, and an inner layer of pressure sensitive adhesive.

1 Claim, 1 Drawing Sheet

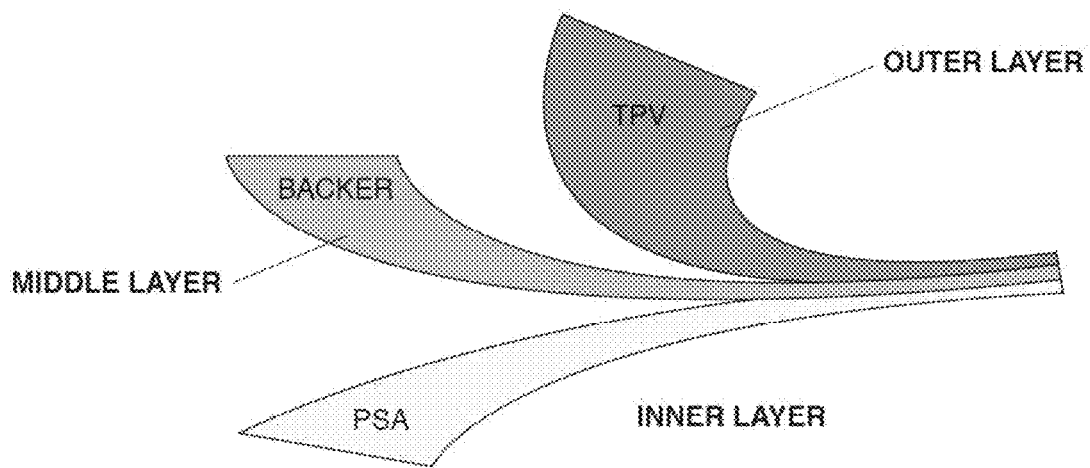

OVERLAY FOR GRIPPING FIREARM

CROSS-REFERENCE TO RELATED APPLICATIONS

This application claims the benefit of U.S. Provisional Patent Application No. 63/012,650, filed on Apr. 20, 2020, entitled "Overlay for Gripping Firearm", which is hereby incorporated by reference in its entirety for all that is taught and disclosed therein.

FIELD OF THE INVENTION

The present invention relates to elastomeric grips for firearms.

BACKGROUND AND SUMMARY

The development of polymer-based firearms has become a noticeable trend in the firearms industry. Many new models of firearms are molded from thermoplastics rather than fabricated from metal. Furthermore, grips or gripping surfaces are integral rather than removable/replaceable. This limits the user to seek alternate methods to customize the gripping surfaces.

Adhesive (stick-on) grips are existing art and have been relevant for many years. Primarily, adhesive grips are composed of either gritty sandpaper skateboard grip tape type or thin elastomeric material. The grit or elastomer is placed on one side for contact with the user and adhesive on the other side to attach to the firearm. These overlays are typically very thin (<1 mm) providing a smaller handling size than an injection molded thermoplastic type grip.

Currently the elastomeric adhesive products are manufactured utilizing a vinyl-based material with a pressure sensitive adhesive attached directly. Vinyl elastomer does indeed provide a soft pleasant surface; however, it is fairly slick feeling and does not exhibit the same friction behavior compared to vulcanized rubber. Vulcanized rubber is what we use for car tires as it offers a high coefficient of friction, resulting in high traction. Conversely, we do not drive around on vinyl tires or elastomers with less traction potential for obvious reasons. Grips for firearms would have a preferred feel and offer more control if made from vulcanized rubber.

The preferred embodiment addresses these concerns by providing a grip for a firearm comprised of an outer layer formed of thermoplastic vulcanite, an intermediate layer having a higher surface energy than the thermoplastic vulcanite, and an inner layer of pressure sensitive adhesive.

BRIEF DESCRIPTION OF THE DRAWINGS

FIG. 1 shows an exploded view of the three layers of the overlay for gripping firearm.

DETAILED DESCRIPTION OF A PREFERRED EMBODIMENT

Currently the elastomeric adhesive products are manufactured utilizing a vinyl-based material with a pressure sensitive adhesive attached directly. Vinyl elastomer does indeed provide a soft pleasant surface; however, it is fairly slick feeling and does not exhibit the same friction behavior compared to vulcanized rubber. Vulcanized rubber is what we use for car tires as it offers a high coefficient of friction, resulting in high traction. Conversely, we do not drive around on vinyl tires or elastomers with less traction potential for obvious reasons.

Grips for firearms would have a preferred feel and offer more control if made from vulcanized rubber.

Vulcanized rubber is more costly to produce as polymer but TPV (ThermoPlastic Vulcanizate) is available and is cheaper to produce shapes and sheets from.

The known problem with utilizing TPV for adhesive grips is the surface energy is poor relating to PSAs (Pressure Sensitive Adhesive). Therefore, the obvious solution is to use an elastomer that offers a higher surface energy like vinyl.

What is not obvious and is the primary claim of this Patent is a specific, unique, multi-layer approach to allow both the preferred feel of TPV for the user and a higher surface energy for PSA to securely adhere to the firearm.

The claimed overlay material is composed of more than two layers. One layer (the outer layer) being TPV, the second layer (middle "backer") being a chemically compatible material with a higher surface energy that is adhered to the TPV with heat and pressure during the extrusion process. Lastly, the inner layer is PSA. The PSA is applied immediately after the middle layer is exposed to an electrified gas (known in the industry as Corona Treatment) or flame to further increase its surface energy to promote adhesion.

Normally, the surface energy of the backer measured in dyne units is a range of 32-40. It is our intention to claim a dyne level of 40-46 for the bond between the backer and PSA. This is attainable by Corona treating the backer material prior to the application of the PSA.

The TPV and backer are both of an olefin chemical base, e.g., Polyethylene, Polypropylene.

Ethylene-Vinyl Acetate can also be used as a backer.

The outer TPV layer hardness is a value of 30-90 on the Shore A scale.

This new overlay can be applied by the user to enhance the frictional contact of the human to the firearm. Any area of the firearm where the user may come in contact is claimed.

I claim:
1. A grip for a firearm comprising:
    an outer layer formed of thermoplastic vulcanite having a hardness value of 30-90 on a Shore A scale;
    an intermediate layer having a higher surface energy than the thermoplastic vulcanite;
    an inner layer of pressure sensitive adhesive; and
    a dyne level of 40-46 for a bond between the outer layer and the intermediate layer.

* * * * *